United States Patent [19]
Brown

[11] 3,742,398
[45] June 26, 1973

[54] DISTRIBUTED RESISTOR-CAPACITOR NETWORK AND METHODS OF FABRICATING A DISTRIBUTED RESISTOR-CAPACITOR NETWORK

[75] Inventor: Donald R. Brown, Downers Grove, Ill.

[73] Assignee: Western Electric Company, Incorporated, New York, N.Y.

[22] Filed: Oct. 26, 1971

[21] Appl. No.: 192,389

[52] U.S. Cl. ......... 333/70 CR, 333/31 C, 333/84 M, 29/600
[51] Int. Cl. ............................ H03h 7/10, H03h 9/00
[58] Field of Search ....................... 333/31 C, 70 CR, 333/84 M; 29/600

[56] References Cited

UNITED STATES PATENTS

| | | | |
|---|---|---|---|
| 2,565,093 | 8/1951 | Robinson et al. | 333/31 C |
| 3,602,770 | 8/1971 | McMahon | 333/70 CR |
| 2,637,777 | 5/1953 | Kilby et al. | 333/70 CR |
| 2,998,840 | 9/1961 | Davis | 333/31 C |
| 3,109,983 | 11/1963 | Cooper et al. | 333/70 CR |
| 2,599,508 | 6/1952 | Allison | 333/70 CR |
| 2,995,688 | 8/1961 | Rosenberg | 317/258 |
| 2,526,321 | 10/1950 | Beverly | 333/31 C |

*Primary Examiner*—Rudolph V. Rolinec
*Assistant Examiner*—Saxfield Chatmon, Jr.
*Attorney*—W. M. Kain, R. P. Miller et al.

[57] ABSTRACT

Two network forming strips are wound to form a distributed resistance-capacitance network roll, each strip being a sheet of dielectric material having a contiguous layer of metal on one side thereof. Two solder termination blocks, one at each end of the network roll, each electrically contact a convoluted length of the edge of a different one of the metal layers, the electrical contacts beginning at the same end of each of the metal layers. The metal layers so contacted form a discrete capacitor in parallel with a distributed capacitor formed by the metal layers not contacted, the metal layers not contacted also forming a distributed resistor in series with both the discrete and the distributed capacitors.

16 Claims, 5 Drawing Figures

INVENTOR
D. R. BROWN
BY Robert A. Lloyd
ATTORNEY

DISTRIBUTED RESISTOR-CAPACITOR NETWORK AND METHODS OF FABRICATING A DISTRIBUTED RESISTOR-CAPACITOR NETWORK

BACKGROUND OF THE INVENTION

1. Field of the Invention

The present invention relates to unitary distributed resistor-capacitor networks and to methods of fabricating such networks, and in particular to a unitary wound, metallized-coated dielectric type of distributed resistor-capacitor network roll, which provides a predetermined impednace function over a selected frequency range, and to methods of fabricating the same.

2. Description of the Prior Art

Generally, present distributed R-C networks of the metal coated paper or of the metal coated plastic film variety are similar in construction to rolled metal coated paper capacitors and to rolled metal coated plastic film capacitors, whose inherent resistive properties are utilized to obtain particular impedance functions over a selected frequency range. The distributed resistance and capacitance of such networks is obtained by connecting electrical contacts to the ends of the metal coatings instead of to a maximum area of one side of each of the coatings as for pure capcitors. For the networks, the contacts with the metal coatings are normally achieved with laid in terminals; that is, with terminals laid across the far extremities of the metal coatings. Such contacts, however, electrically engage only a very small area of the thin metal coatings and are often burned away when the network is subjected to high current pulses, resulting in an open circuit and a useless network.

An object of the invention is to provide a distributed R-C network, and a method of fabricating the same, having high current carrying capabilities.

SUMMARY OF THE INVENTION

In accordance with the present invention, a distributed resistance-capacitance network roll is fabricated from first and second network forming strips, each strip including a sheet of dielectric material having a conductive metal layer contiguous to one side thereof, by winding the strips together to overlap portions of the conductive layers. The dielectric material of one of the strips is spaced between the metal layer of that strip and the layer of the other strip, and the metal layers overlap a constant amount along thier lengths and over less than 50 percent of their total overlapped width. The low frequency capacitance of the network roll is determined by the length of the strips, by the amount of overlap of the respective metal layers, and by the properties of the dielectric material. At each end of the network roll a length of the edge of a different one of the metal layers, starting at the same end of each strip, is electrically contacted, the length of each layer contacted being less than the total length of that layer. The length, and the resistance per unit length, of the metal layers not electrically contacted determine the distributed resistance of the network. The area of the overlapping portions of the layers of metal not electrically contacted, and the properties of the dielectric material, determine the distributed capacitance of the network.

Preferably, at a low frequency ($f_1$) which approaches zero, the network has a resistance to capacitance $R/C_T$ ratio of at least 80, where $C_T$ is the total low frequency capacitance value of the network in microfarads and is comprised of a discrete capacitor having a capacitance value $C_2$ in parallel with a distributed capacitor having a low frequency capacitance value $C_1$, and where R is the low frequency resistance value of a distributed resistor in ohms, the resistor being in series with the total capacitance $C_T$. A first length of each of the network forming strips is provided, the first length being equal to that length of metal layer required to provide a low frequency distributed resistance value of R/2, when measured at one end of the layer, in accrdance with the resistance per unit length of the layer. The first lengths of the strips are overlapped such that the dielectric material of one of the strips is spaced between the metal layer of that strip and the metal layer of the other strip, the amount of overlap being sufficient, when taken in conjunction with the first lengths of the strips and the properties of the dielectric material thereof, to provide an unrolled capacitor having the capacitance value $C_1/2$. A second length of each of the strips is then provided, each second length being continuous with and part of a different one of the first lengths of the strips. The metal layers of the second lengths overlap to the same extent as the metal layers of the first lengths, and the second lengths of the strips are sufficient, when taken in conjunction with the amount of overlap of the metal layers and the properties of the dielectric material to provide an unrolled capacitor having the capacitance value $C_2/2$. The strips are then wound together to form a network roll.

Electrical terminations to the opposite ends of the roll may be established by spraying molten solder over an area at each end of the network roll, the size and shape of the area being chosen so that at each end of the network a length of the metal layer of a different one of the strips, equal to the second length and starting at the same end of each strip, is electrically contacted. The metal coatings so electrically contacted provide a discrete capacitor having the capacitance value $C_2$ and the metal coatings not electrically contacted provide a distributed capacitor and resistor having the low frequency ($f_1$) values $C_1$ and R, respectively. The network, in response to the low frequency ($f_1$) energizing signal applied to the electrical terminations, exhibits a first impedance $Z_1 = R - j/2\pi f_1(C_1+C_2)$. In response to a high frequency ($f_2$) energizing signal, the high frequency ($f_2$) being at least equal to the frequency at which the values $C_1$ and R approach zero, the network exhibits a second, and lower, impedance approximating $Z_2 = -j/2\pi f_2 C_2$.

Other objects, advantages and features of the invention will be apparent upon consideration of the following detailed description when taken in conjunction with the appended drawings.

DETAILED DESCRIPTION

Figure 1:
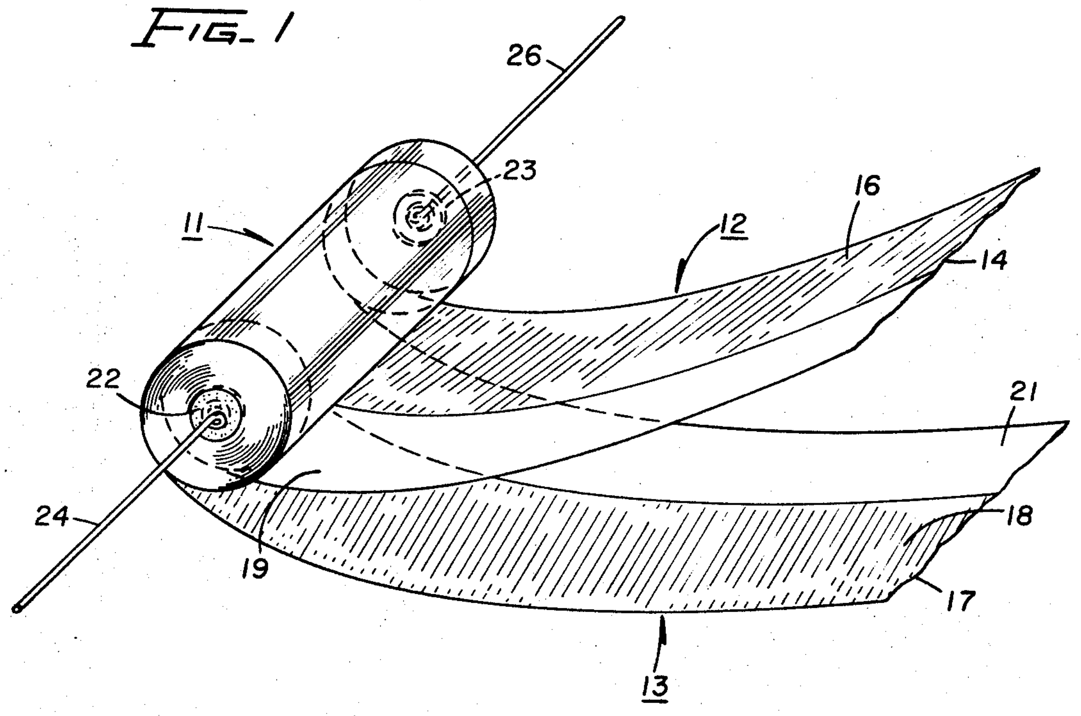
FIG. 1 illustrates the structure of an R-C network made in accordance with the present invention.

The distributed R-C network 11 of the present invention shown in FIG. 1 of the drawings includes two network forming strips 12 and 13, the strip 12 including a sheet of dielectric material 14 having a contiguous and conductive metal layer 16 on one side thereof, and the strip 13 including a sheet of dielectric material 17 having a contiguous and conductive metal layer 18 on one side thereof. The dielectric sheets 14 and 17 may be of paper or plastic such as polycarbonate, polystyrene or polyester sold under the tradename "Mylar;" however, any flexible dielectric material may be used. The metal layers 16 and 18 may be of any conductive material such as aluminum, silver, zinc or alloys thereof. Preferably, the conductive layers 16 and 18 are positioned contiguous to their respective sheets of dielectric material by coating one side of the sheets using metal vapor deposition or sputtering techniques, and are considered as being so positioned in the description of the invention. However, the metal layers may also be positioned contiguous to the dielectric sheets by placing a strip of metal foil next to the sheet without bonding the surfaces together.

Figure 2:
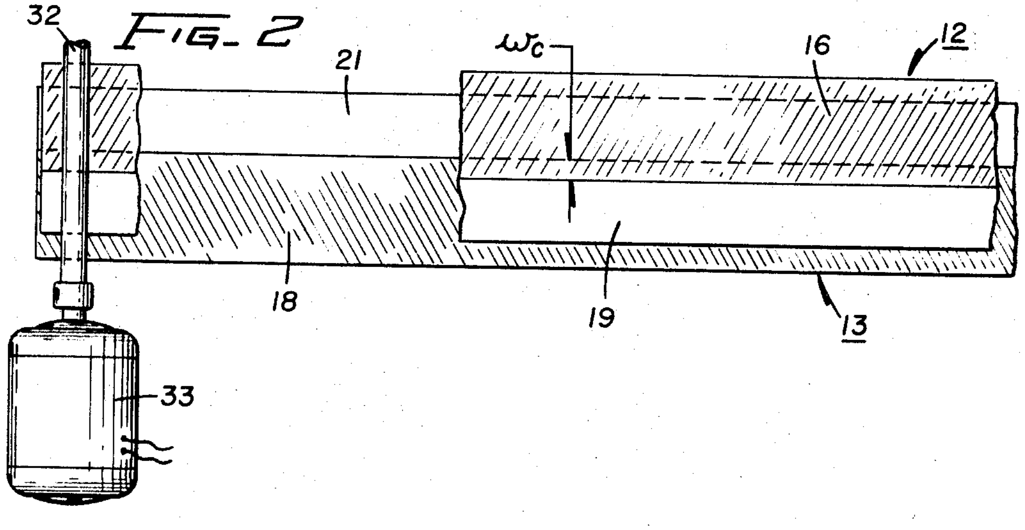
FIG. 2 is a plan view of the entwork forming strips which are included in the structure of FIG. 1.

The strips 12 and 13 are convoluted, or wound, together with a selected amount of the metal coatings overlapping along their lengths to form the network roll 11. The dielectric material of one of the strips is positioned between the metal coating carried on that strip and the metal coating carried on the other strip to provide electrical isolation between the metal coatings, as electrical contact between the metal coating of one of the strips and the metal coating of the other strip would destroy the usefulness of the network 11. To control the amount of overlap and to insure against accidental electrical contact between the two metal coatings 16 and 18, each of the metal coatings is preferably deposited across only a portion of its associated dielectric material to provide an uncoated area, or margin, thereon, a margin 19 being provided on the dielectric material 14 and a margin 21 being provided on the dielectric material 17. When the strips 12 and 13 are convoluted about one another, the margins 19 and 21 are positioned such that the margin of each of the strips overlies the metal coating of the other strip, as is best shown in FIG. 2.

At each end of the network roll an electrical connection is provided to a different one of the metal coatings of the network forming strips by two solder blocks 22 and 23, the solder block 22 electrically engaging the metal coating 18 of the network forming strip 13 and the solder block 23 electrically engaging the metal coating 16 of the network forming strip 12. The solder blocks may be sprayed, in the molten solder state, onto each of the network ends by conventional solder spraying apparatus (not shown). The convoluted network forming strips 12 and 13 are preferably offset with respect to each other, as best shown in FIG. 2, to facilitate electrical engagement between the solder and the edge of the metal coating at each end of the network without electrically shorting the two metal coatings together. Lead connections are made to each of the solder blocks 22 and 23 by conductors 24 and 26, respectively.

Each of the solder blocks 22 and 23 electrically contacts the edge of a different one of the metal coatings 16 and 18 along a predetermined length which is appreciable, but which is substantially less than the overall, or total, length of the metal coating, the length contacted being predetermined, as explained below, to control various parameters of the distributed network. It is to be noted that the contacts provided to the metal coatings of the network of the invention differ from the contacts provided to the sides of known rolled capacitors, wherein it is attempted and desired to contact a maximum length of the edge of each of the caotings. They also differ from the contacts provided to present R-C networks, wherein only a very small area at an end of each of the metal coatings is contacted. By electrically contacting an appreciable length of the side of each of the thin metal coatings a current carrying connection, which is not readily subject to being burned away, is provided to the network of the invention.

Figure 3:
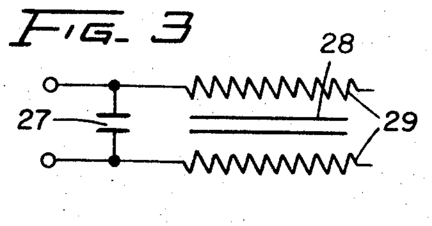
FIG. 3 is the electrical circuit equivalent of the network shown in FIG. 1.

The electrical circuit equivalent of the device shown in FIG. 1 is shown in FIG. 3, and is a discrete capacitor 27 connected in parallel with a distributed capacitor 28, both of the capacitors being connected in series with a distributed resistor 29. The discrete capacitor 27, formed by the lengths of the metal coatings 16 and 18 which are both contacted by the solder blocks 23 and 22, respectively, and complementary with respect to the dielectric between them, has a negligible effective series resistance in comparison with the overall resistance of the network 11 and is therefore, for the purpose of the electrical circuit equivalent, shown as a pure capacitance. The distributed capacitor 28 and the distributed resistor 29 are formed by the lengths of the remaining metallized coatings 16 and 18 of the network roll 11 which are not electrically contacted by the solder blocks 22 and 23.

The resistance to capacitance (R/C) ratio of the network of the invention is at least 80, where R is the low frequency resistance of the network in ohms and C is the total low frequency capacitance of the entwork in microfarads. This ratio may be achieved by overlapping less than 50 percent of the total overlapped width of the metal coatings to decrease the capacitance of the entwork so that the resistance becomes significant with respect to the capacitance. This differes from known capacitors wherein overlap of at least 80 percent of the total overlapped width of the metal coatings is desired, and wherein a maximum end area of the capacitor is electrically contacted, to maximize the capacitance value of the capacitor with respect to the inherent resistance value of the capacitor. The R/C ratio for a capacitor is generally less than 0.1. The network of the invention also differs from present R-C distributed rolled networks which are purely distributive and wherein a discrete capacitor is not provided.

The capacitance value of the discrete capacitor is determined by the following items: (1) the amount of overlap $w_c$ of the metallized coatings 16 and 18; (2) the dielectric constant of the dielectric materials 14 and 17; (3) the thickness of the dielectric materials 14 and 17; and (4) the length of the metallized coatings 16 and 18 which both overlap and are contacted by the solder blocks 24 and 26, respectively. The capacitance value of the distributed capacitor is determined in a similar manner, except that the length of the metal coatings defining the distributed capacitor is that length not contacted by the solder blocks, rather than the length contacted. The value of the distributed resistor is likewise determined by the length of the metal coatings not contacted by the solder blocks, in conjunction with the resistivity, and therefore the resistance per unit of length, of the metal coatings. Therefore, through the proper selection of dielectric materials, metal coating patterns, resistivity of metal coatings, dielectric thickness, length and width of metal coatings, size of solder blocks, etc., it is possible to obtain a distributed R-C network having a preselected low frequency capacitance and resistance between the end contacts of the network.

For example, assume that it is desired to fabricate the distributed R-C network of the invention having a preselected low frequency ($f_1$) distributed capacitance value $C_1$, a discrete capacitance value $C_2$, and the low frequency ($f_1$) distributed resistance value R, the distributed and the discrete capacitors being in a parallel connection with each other and in a series connection with the distributed resistor, and the low frequency ($f_1$) being a frequency which approaches zero. For a particular network forming strip material, the width and resistance per unit of length of the metal coating thereof, as well as the thickness and dielectric constant of the sheet of dielectric material thereof, are known. Given the resistance per unit of length of the metal coating of the network forming strip, the length of each of the two network forming strips required to provide the low frequency distributed resistance value R, as measured at the ends of the strips, may be easily determined. That length of each of the network forming strips, when taken in conjunction with the dielectric properties of the dielectric material, determines the required amount of overlap $w_c$ of the metal coatings to provide the low frequency distributed capacitance value $C_1$ when the strips are wound together. The network forming strips are overlapped the determined amount and the strips are wound on an arbor 32 by a motor 33 until the lengths have been wound thereon.

Using the amount of overlap of the metallized coatings on the lengths of strips required to provide the capactiance value $C_1$, the additional length of each of the strips required to provide a capacitor having the value $C_2$ when the strips are wound together is determined. The additional lengths of the strips are wound onto the arbor 32, each continuous with and part of a different one of the first lengths of strips, and the rolled network is then removed from the arbor. Molten solder is then sprayed onto an area at each end of the network roll to form at each end an electrical connection with a different one of the metal coatings of the network forming strips. The size and location of each area sprayed is such that complementary lengths of the edges of the metal coatings are electrically contacted, the lengths being complementary with respect to the dielectric between them and each being equal in length to the additional length of each of the strips required to provide the capacitance value $C_2$. Preferably, the connections to the metal coatings start at the same end of each of the strips, each connection engaging the edge of a different one of the metal coatings for a length equal to the additional length. The mutually overlapping and contacted portions of the metal coatings form a discrete capacitor having the value $C_2$, and the remaining portions of the metal coatings form both a distributed capacitor having the value $C_1$, in parallel with the discrete capacitor, and a distributed resistor having the value R, in series with both the discrete and the distributed capacitors.

In a similar manner, distributed R-C networks may be fabricated having desired combinations of parameters as follows: (1) a low frequency capacitance $C_T$ and a distributed resistance R; (2) a discrete capacitance $C_2$ and a distributed resistance R; and (3) a distributed capacitance $C_1$ and a distributed resistance R.

It is to be noted that the distributed resistance value of any one of the two metallized coatings is R/2, the two coatings acting in series to provide the total distributed resistance R. It is also to be noted that the total capacitance value exhibited by the two overlapping but nonconvoluted metal coatings is $C_T/2$, the overlapping and convoluted coatings providing the capacitance value $C_T$ since, in the convoluted form, the area of overlapping metal is doubled.

The distributed R-C network exhibits, in response to the low frequency ($f_1$) energizing signal applied across its input leads 24 and 26, an impedance $Z_1 = R = j/2\pi f_1(C_1+C_2)$. As the frequency of the energizing signal applied to the leads 24 and 26 increases, the effective distributed resistance $R$ and distributed capacitance $C_1$ decrease until, at a high energizing signal frequency ($f_2$), the network exhibits a second and lower impedance approximating $Z_2 = -j/2\pi f_2 C_2$. The high frequency ($f_2$) is at least equal to the frequency at which the values of $C_1$ and $R$ approach zero. The impedance decreases in response to an increased frequency energizing signal as a result of the reduced time available for electron movement through the length of the metal coatings not electrically engaged on their side by the solder blocks at the ends of the network. Therefore, the total distance traveled by the electrons at the higher frequency is shorter, resulting in an effective shorter length of the noncontacted metal coatings.

Figure 4:
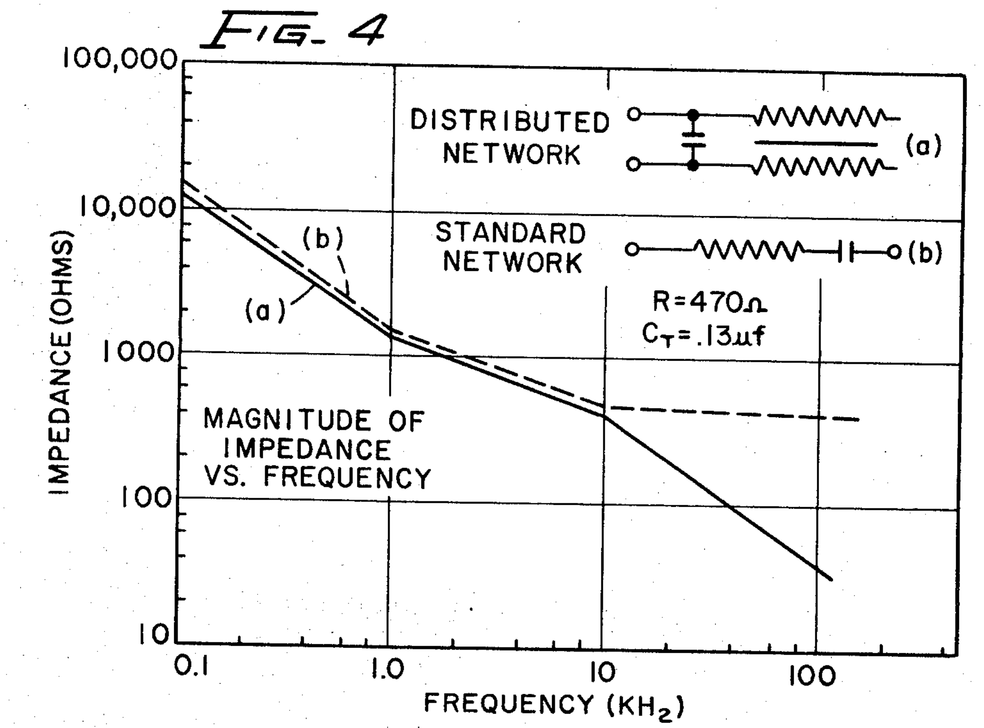
FIG. 4 is a graph showing the impedance function characteristics of both a conventional nondistributed R-C network and a distributed R-C network made in accordance with the present invention.
Figure 5:
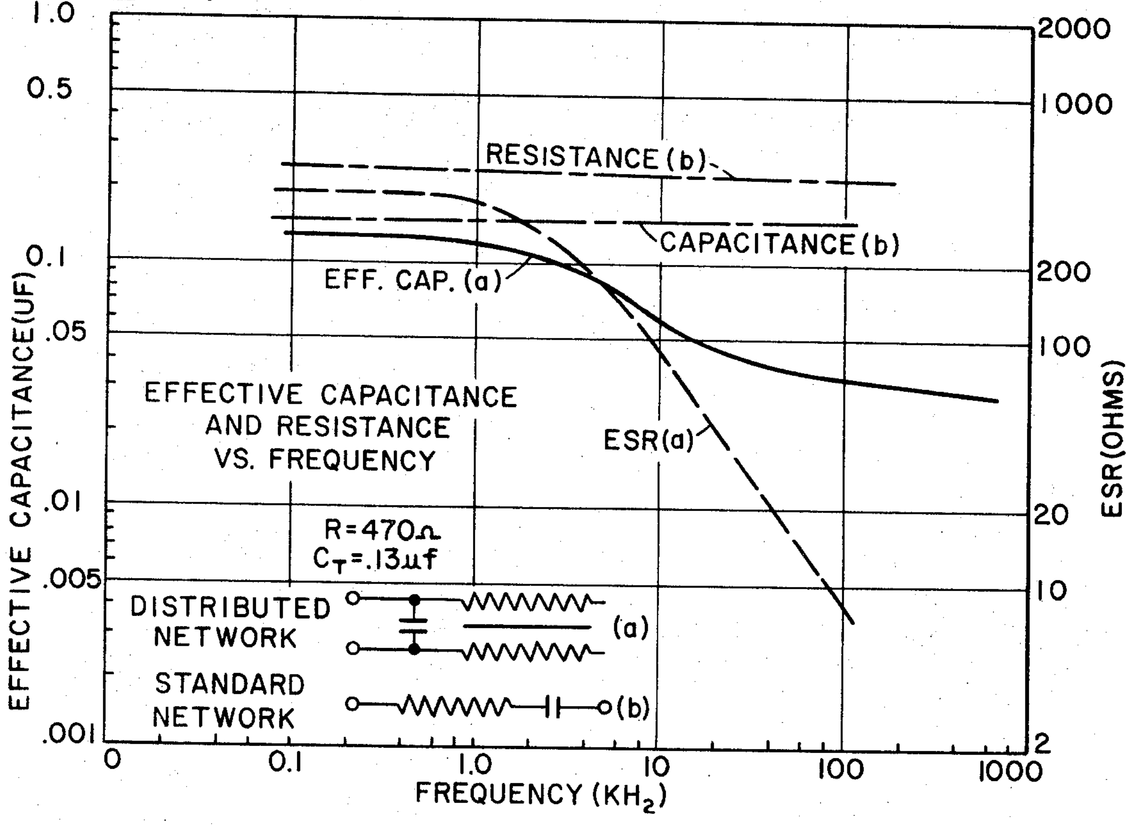
FIG. 5 is a graph showing the capacitive and resistive function characteristics of both a conventional nondistributed R-C network and a distributed R-C network made in accordance with the present invention.

FIG. 4 shows the impedance function characteristics, and FIG. 5 shows the capacitive and resistive function characteristics, of a standard, or conventional, series-connected discrete element, nondistributed R-C network, and of a distributed R-C network made in accordance with the present invention. Both networks have a resistance of 470 ohms and a total capacitance $C_T$ of 0.13 microfarads, the resistance and the capacitance of the distributed network being the low frequency resistance and capacitance. Referring to FIG. 4, it is seen that the impedance, impedance curve ($b$), of the standard network decreases with increasing frequency until a level at approximately 10KHZ is reached where the resistive component dominates. Then the impedance becomes essentially constant and equal to the resistance at all frequencies about that level. On the other hand, the impedance of the distributed network, impedance curve ($a$), continues to decrease with increasing frequency because the effective series distributed resistance decreases, and while it is true that the effective capacitance also decreases, nevertheless the net impedance decreases.

Referring to FIG. 5, it is seen that the resistance and the capacitance values, resistance curve ($b$) and capacitance curve ($b$), of the standard network remain essentially constant with increasing frequency. The resistance, effective series resistance curve ($a$), of the distributed network, however, continues to decrease with increasing frequency, and the capacitance, effective capacitance curve ($a$), will decrease with increasing frequency until the value of the discrete capacitance is reached. At that point, the value of the capacitance will remain essentially constant and equal to the value of the discrete capacitance.

While one particular embodiment of the invention has been described in detail, it is understood that various other modifications and embodiments may be devised by one skilled in the art without departing from the spirit and scope of the invention. For example, instead of forming a network roll from first and second dielectric materials, each having a metal coating carried on one side thereof, a dielectric material having a metal coating on both sides thereof, the metal coatings being electrically isolated one from the other and overlapped a determined amount, may be wound with a non-metal coated dielectric to form a convoluted network roll. Also, it is not essential to the practice of the present invention that the solder blocks electrically contact a length of the edge of each of the metal coatings starting at the ends of the coatings. Rather, complementary lengths of the edges of the metal coatings may be contacted at any point to form the discrete capacitor between the contacted portions, the remaining portions of the metal coatings forming the distributed capacitor and resistor.

What is claimed is:

1. A method of fabricating a network that exhibits a first impedance characteristic in response to a signal applied at a first frequency thereto, and a second and lower impedance in response to a signal applied at a second and higher frequency thereto, which comprises:

positioning two strips of insulating material and two strips of metal in alternate overlapping relationship with the strips of metal positioned to overlap each other along their lengths over less than 50 percent of their widths;

rolling the overlapping strips of insulating material and metal along their lengths into convolutions, and placing electrical terminations in contact with sections of the opposed edges of the respective metal layers to contact sections that are less than the total length of the convoluted metal strips and to form a network exhibiting a low frequency impedance equal to $R - j/2\pi f_1(C_1+C_2)$, where $f_1$ is a low frequency which approaches zero, $R$ is a distributed resistance along the sections of the metal layers not contacted, $C_1$ is a distributed capacitance between the overlapping and noncontacted sections of the metal layers, and $C_2$ is a discrete capacitance between the overlapping and contacted sections of the metal layers, and exhibiting an impedance which approaches $-j/2\pi f_2 C_1$ in response to a second and higher frequency signal applied thereto.

2. A method of fabricating a distributed resistance-capacitance network roll from first and second network forming strips, each strip being a sheet of dielectric material having a conductive, metal layer contiguous to one side thereof, which comprises:

winding a length of each of the strips together to form a network roll with the sheets of dielectric material of the strips spaced between the metal layers and with the metal layers overlapping a constant amount along their lengths which is less than 50% of the total width of the network roll to form a network wherein the low frequency capacitance is determined by the length of the strips, by the amount of overlap of the metal layers, and by the properties of the dielectric material, and electrically contacting at each end of the network roll a complementary length of the edge of a different one of the metal layers, which is less than the total length of that layer, to form in the entwork a distributed resistance determined by the resistance per unit length of the metal layers not electrically contacted and a distributed capacitance determined by the lengths of the metal layers not electrically contacted, in conjunction with the amount of overlap of the layers and the properties of the sheets of dielectric material.

3. The method as recited in claim 2, wherein the metal layers contiguous to the sheets of dielectric material are metal coatings carried on one side of each of the sheets of dielectric material, and wherein the electrical contacting step comprises applying a solder block over a central area of a selected size at each end of the network to contact at each end a length of the edge of a differnt one of the metal coatings beginning at the same end of each strip.

4. A method of fabricating a distributed resistance-capacitance network roll from first and second network forming strips, each strip being a sheet of dielectric material having a conductive, metal layer contiguous to one side thereof, the metal layer extending over less than the entire width of each strip to form a margin thereon, the network in response to a low frequency energizing signal exhibiting an impedance characteristic of a resistor and a capacitor connected in series, and in response to an increasing frequency energizing signal exhibiting a decreasing impedance approaching the characteristic of a pure capacitance, which comprises:

overlapping a width of the metal layers of the strips a constant amount along their lengths which is less than 50 percent of the overall width of the metal layers and with the dielectric material of one of the strips separating the metal layer of that strip from the metal layer of the other strip and with the metal layer of each strip overlying the margin of the other strip;

winding a length of the overlapping strips together to form a network roll, and applying an electrical termination over an area of a selected size and location at each end of the network roll to contact at each end a different metal layer under the termination area along a length of the edge thereof, to form with the metal layers under the termination area, which are complementary with respect to the dielectric between them, a discrete capacitor, to form with the metal layers not both under the termination area and complementary with respect to the dielectric between them, a distributed capacitor in parallel with the discrete capacitor and a distributed resistor in series with both the distributed and discrete capacitors, and to form with the distributed resistor, the discrete capacitor, and the distributed capacitor the rolled network exhibiting an impedance, in response to a low frequency energizing signal, essentially equal to the impedance of the parallel connected discrete capacitor and distributed capacitor in series with the distributed resistor, and exhibiting an impedance, in response to a high frequency energizing signal, approaching the impedance of the discrete capacitor.

5. The method as recited in claim 4, wherein winding the length of the overlapping strips comprises:

winding a first length of the overlapping strips to provide an area at each end of the network roll having a size equal to the selected size of the termination area, and continuing to wind the overlapping strips an additional length which provides a given value of the distributed resistor, at the low frequency, in accordance with the resistance of the metallized coatings per unit length of the overlapping strips.

6. The method as recited in claim 5, wherein overlapping a width of the metal layers of the strips comprises:

overlapping the metal layers an amount sufficient, when taken in conjunction with the length of the strips in the network roll and the properties of the dielectric material of the strips, to provide a network roll having a capactiance value, at the low frequency, which is equal to the capacitance value of the parallel connected discrete capacitor and distributed capacitor.

7. The method as recited in claim 4, wherein applying an electrical termination over an area of the selected size and location at each end of the network roll comprises:

electrically contacting at each end of the network roll a complementary length of the edge of a different one of the metal layers to provide with the remaining lengths of uncontacted metal layers a given value of the distributed resistor, at the low frequency, in accordance with the resistance per unit length of the metal layers.

8. The method as recited in claim 7, wherein overlapping the width of the metal layers of the strips comprises:

overlapping the metal layers an amount sufficient, when taken in conjunction with the length of the strips in the network roll and the properties of the dielectric material thereof, to provide a capacitance value of the network roll, at the low frequency, which is equal to the capacitance value of the parallel connected discrete capacitor and distributed capacitor.

9. A method of fabricating a distributed resistance-capacitance network roll, having a low frequency ($f_1$) resistance value $R$ and capacitance value $C_T$, from first and second network forming strips, each strip being a sheet of dielectric material having a conductive, metal layer contiguous to one side thereof, the network exhibiting a first impedance approximating $Z_1 = R - j/2\pi f_1(C_1+C_2)$, where $C_1+C_2 = C_T$, in response to the low frequency ($f_1$) energizing signal applied thereto, and exhibiting a second and lower impedance approximating $Z_2 = -j/2\pi f_2 C_2$ in response to a high frequency ($f_2$) energizing signal applied thereto, which comprises:

overlapping the metal layers of a length of each of the network forming strips a constant amount along their length and with the dielectric material of one of the strips spaced between the metal layer of that strip and the metal layer of the other strip and with the amount of overlap, in conjunction with the length of the strips and the properties of the dielectric materials thereof providing, when the strips are convoluted together, a resistance-capacitance network roll having the low frequency ($f_1$) capacitance of $C_1+C_2$;

winding the lengths of the strips together to form the network roll, and electrically contacting at each end of the network roll, starting at the same end of each strip, a length of the edge of the metal layer of a different one of the strips to form with the portions of the metal layers electrically contacted a discrete capacitor having the capacitance value $C_2$ and to form with the portions of the metal layers not electrically contacted a distributed capacitor and resistor having the low frequency ($f_1$) values $C_1$ and $R$, respectively, the length of the edge of each metal layer electrically contacted being chosen to provide with the length of the metal layers not so electrically contacted, when taken in conjunction with the resistance per unit length of the metal layers, the low frequency ($f_1$) distributed resistance having the value $R$.

10. A method of fabricating a distributed resistance-capacitance network roll from first and second network forming strips, each strip being a sheet of dielectric material having a conductive, metal layer contiguous to one side thereof, the network exhibiting a first impedance approximating $Z_1 = R - j/2\pi f_1(C_1+C_2)$ in response to a low frequency ($f_1$) energizing signal applied thereto, and exhibiting a second and lower impedance approximating $Z_2 = -j/2\pi f_2 C_2$ in response to a high frequency ($f_2$) energizing signal applied thereto, where R is the low frequency ($f_1$) resistance value of a distributed resistor, $C_1$ is the low frequency ($f_1$) capacitance value of a distributed capacitor, and $C_2$ is the capacitance value of a discrete capacitor, which comprises:

overlapping the metal layers of the network forming strips with the dielectric material of one of the strips spaced between the metal layer of that strip and the metal layer of the other strip;

winding a first length of the overlapping strips to form a capacitor having the capacitance value $C_2$ with the metal layers overlapping a constant amount along their length;

continuing to wind the overlapping strips with the constant overlap until a second additional length has been wound which is the length of the overlapping strips required to form the distributed resistor having the low frequency ($f_1$) resistance value $R$, in accordance with the resistance per unit length of the metal layers, and to form with the second additional length of the overlapping metal layers the distributed capacitor having the low frequency ($f_1$) capacitance value $C_1$, and electrically contacting at each end of the network roll, starting at the same end of each strip, a length of the edge of a different one of the metal layers equal to the first length, to form with the portions of the metal layers electrically contacted the discrete caacitor having the capacitance value $C_2$ and to form with the portions of the metal layers not electrically contacted the distributed capacitor and resistor having the low frequency ($f_1$) values $C_1$ and $R$, respectively.

11. A method of fabricating a distributed resistance-capacitance network roll from first and second network forming strips, each strip being a sheet of dielectric material having a conductive, metal layer contiguous to one side thereof, the network having a low frequency distributed resistance value $R$ and a low frequency distributed capacitance value $C_1$, and having at each of its ends an electrical termination of a selected size, each electrical termination, in accordance with the selected size, making electrical contact with a length of the edge of a different one of the metal layers, the contact beginning at the same end of each of the metal layers, which comprises:

providing a length of each of the network forming strips equal to the length of each metal layer contacted by each electrical termination plus the length of the metal layer of a strip required to provide a low frequency distributed resistance having a value $R/2$ as measured at its end, in accordance with the resistance per unit length of the metal layer of the strip;

overlapping the metal layers of the strips a constant amount along their lengths with the dielectric material of one of the strips spaced between the metal layer of that strip and the metal layer of the other strip and with the amount of overlap, in conjunction with the properties of the dielectric material of the strips and the length of the metal layer of each strip required to provide the distributed resistance value $R/2$, providing, when the strips are convoluted together, the low frequency network roll distributed capacitance value $C_1$;

winding the lengths of the strips together to form a network roll, and applying the electrical termination of the predetermined size to each end of the network roll to electrically contact with each termination a different one of the metal layers to form with the portions of the metal layers contacted by the terminations a discrete capacitor connected in parallel with the distributed capacitor having the value $C_1$, which is formed by the overlapping portions of the metal layers not electrically contacted, and which is connected in series with the distributed resistor, having the value $R$, which is also formed by the portions of the metal layers not electrically contacted.

12. A method of fabricating a distributed resistance-capacitance network roll from first and second network forming strips, each strip being a sheet of dielectric material having a conductive, metal layer contiguous to one side thereof, the network having a low frequency ($f_1$) resistance to capacitance $R/C_T$ ratio of at least 80, where $C_T$ is the total low frequency ($f_1$) capacitance value of the network in microfarads and is comprised of a discrete capacitor having a capacitance value $C_2$ in parallel with a distributed capacitor having a low frequency ($f_1$) capacitance value $C_1$, and where R is the low frequency ($f_1$) resistance value of a distributed resistor in ohms and is in series with the total capacitance, which comprises:

providing a first length of each of the network forming strips to provide with each strip a low frequency distributed resistance value of $R/2$, when measured at one end of the metal layer of the strip, in accordance with the resistance per unit length of the metal layer;

overlapping the metal layers of the first lengths of strip a constant amount along their lengths and with the dielectric material of one of the strips spaced between the metal layer of that strip and the metal layer of the other strip and with the amount of overlap, when taken in conjunction with the first length of the strips and the properties of the dielectric material of the strips, forming an unrolled capacitor having the capacitanc value $C_1/2$;

providing a second length of each of the strips continuous with and part of a different one of the first lengths of the strips and with the metal layers thereof overlapping the constant amount to form, when taken in conjunction with the amount of overlap of the metal layers and the properties of the dielectric materials thereof, an unrolled capacitor having the capacitance value $C_2/2$;

winding the strips together to form a network roll, and applying an electrical termination at each end of the network starting at the same end of the entwork forming strips and electrically contacting the edge of a different one of the metal layers for a length equal to the second length of the strips to form with the portions of the overlapping metal layers electrically contacted a discrete capacitor having the capacitance value $C_2$ and to form with the metal layers not electrically contacted a distributed capacitor and resistor having the low frequency ($f_1$) values $C_1$ and $R$, respectively, the distributed resistor and capacitor, and the discrete capacitor, together forming the network roll which exhibits, in response to the low frequency ($f_1$) energizing signal applied to the electrical terminations thereof, a first impedance $Z_1 = R - j/2\pi f_1(C_1+C_2)$, and in response to a high frequency ($f_2$) energizing signal applied to the electrical terminations thereof, a second and lower impedance approximating $Z_2 = -j/2\pi f_2 C_2$.

13. A distributed resistance-capacitance network, comprising:

a pair of convoluted electrically conductive layers positioned to overlap over less than 50 percent of their respective widths;

layers of insulating material interposed between the convoluted conductive layers; and electrical terminations contacting complementary sections of opposite edges of the respective conductive layers for forming a discrete capacitance between the contacted layers and for forming a distributed resistance and capacitance along and between the uncontacted layers.

14. A distributed capacitor-resistor network roll having a frequency dependent impedance, the network exhibiting a first impedance $Z_1$ in response to a low frequency ($f_1$) energizing signal applied thereto and exhibiting a decreasing impedance in response to an increasing frequency energizing signal applied thereto, which comprises:

first and second overlapping, convolutely wound network-forming strips, each strip being a sheet of dielectric material having a conductive, metal layer contiguous to one side thereof, the dielectric material of one of the strips separating the metal layer of that strip from the metal layer of the other strip and the metal layers overlapping a constant amount along their lengths and over less than 50 percent of the total width of the network roll, and means, at each end of the network roll, for electrically contacting a length of the edge of a different one of the metal layers beginning at the same end of each of the strips, the overlapping portions of the metal layers electrically contacted forming a discrete capacitor in parallel with a distributed capacitor formed by the remaining portions of the metal layers, the remaining portions of the metal layers also forming a distributed resistor in series with both the discrete and the distributed capacitors.

15. The distributed resistor-capacitor network as recited in claim 14, wherein:

the metal layer contiguous to the dielectric material of each strip extends over less than the entire width of the dielectric material to form an uncoated margin thereon; and the strips are overlapped such that the metal layer of each strip overlies the margin of the other strip.

16. A distributed resistor-capacitor network roll having a predetermined low frequency ($f_1$) resistance $R$ and capacitance $C_T$, the network exhibiting a first impedance $Z_1 = R - j/2\pi f_1(C_1+C_2)$, where $C_T = C_1+C_2$, in response to the low frequency ($f_1$) energizing signal applied thereto, and exhibiting a second and lower impedance approximating $Z_2 = - j/2\pi f_2 C_2$ in response to a high frequency ($f_2$) energizing signal applied thereto, which comprises:

a length of first and second convolutely wound and overlapping network forming strips, each strip being a sheet of dielectric material having a conductive metal layer contiguous to one side thereof, the metal layers of the strips being overlapped a constant amount along their lengths and such that the dielectric material of one of the strips is spaced between the metal layer of that strip and the metal layer of the other strip, the amount of overlap of the metal layers, in conjunction with the length of the strips and the properties of the dielectric materials thereof, being sufficient to provide a low frequency ($f_1$) network capacitance of $C_1+C_2$, and means at each end of the network roll for electrically contacting a length of the edge of a different one of the metal layers, the electrical contact at each end beginning at the same end of each of the metal layers, to form with the overlapping metal layers so electrically contacted a discrete capacitor having the value $C_2$, and to form with the remaining metal layers a distributed capacitor having the value $C_1$, in parallel with the discrete capacitor, the remaining layers also forming a distributed resistor, having the value $R$, in series with both the discrete capacitor and the distributed capacitor, the resistance per unit length of the remaining metal layers determining the value of the resistance $R$.

* * * * *

L-566-PT
(6-69)

UNITED STATES PATENT OFFICE
CERTIFICATE OF CORRECTION

Patent No. 3,742,398 Dated June 26, 1973

Inventor(s) D. R. Brown

It is certified that error appears in the above-identified patent and that said Letters Patent are hereby corrected as shown below:

Column 1, line 13, "impednace" should read --impedance. Column 1, line 49, "thier" should read --their--. Column 2, line 11, "accrdance" should read --accordance--. Column 2, line 60, "entwork" should read --network--. Column 4, line 14, "caotings" should read --coatings--. Column 4, line 42, "entwork" should read --network--. Column 4, line 46, "entwork" should read --network--. Column 6, line 22, "$Z_1$ = R =" should read "$Z_1$ = R -". Column 8, line 7, "entwork" should read --network--. Column 8, line 22, "differnt" should read --different--. Column 10, line 58, "caacitor" should read --capacitor--. Column 12, line 3, "capacitanc" should read --capacitance--. Column 12, line 15, "entwork" should read --network--.

Signed and sealed this 27th day of November 1973.

(SEAL)
Attest:

EDWARD M.FLETCHER,JR.
Attesting Officer

RENE D. TEGTMEYER
Acting Commissioner of Patents